Patented Apr. 10, 1951

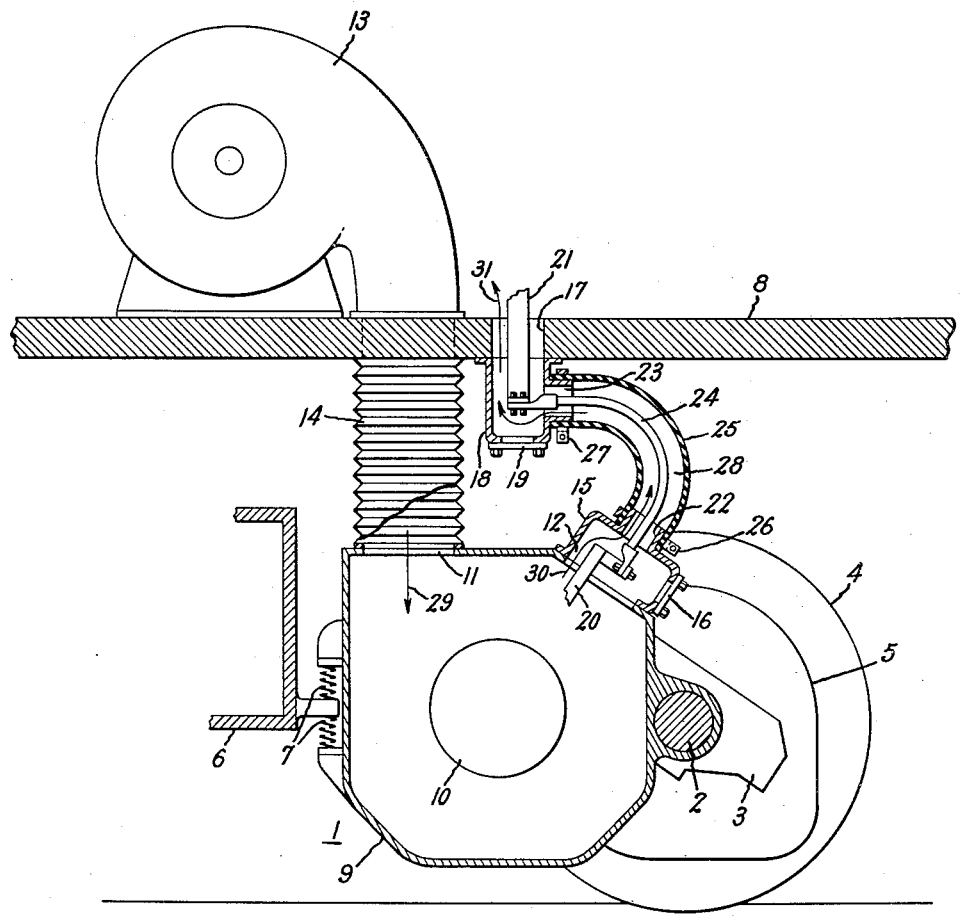

2,548,614

UNITED STATES PATENT OFFICE 2,548,614

VENTILATED ELECTRICAL CONDUCTOR FOR RAILWAY MOTORS

William W. Peters, Erie, Pa., assignor to General Electric Company, a corporation of New York Application March 10, 1950, Serial No. 148,873

5 Claims. (Cl. 172—36)

This invention relates to a ventilated lead for electrical apparatus and more particularly to flexible ventilated leads for vehicle traction motors.

The leads for conventional direct current traction motors for railway service are not required to carry a particularly heavy unit current flow and thus the standard stranded conductor with varnished cambric and cotton braid or rubber insulation is usually small enough in cross section and long enough to be sufficiently flexible to allow for truck swing. However, in installations where high current traction motors, such as series alternating current motors, are utilized, the motor leads are required to carry a much heavier current flow than normal lead construction will permit. Thus, if the leads for such motors were provided with conventional insulation, they would be too stiff in the lengths involved to prevent excessive wear under the truck swing conditions encountered.

An object of this invention is to provide a ventilated conductor for electrical apparatus.

Another object of this invention is to provide a ventilated lead for a dynamoelectric machine.

A further object of this invention is to provide an improved traction motor lead utilizing forced or induced cooling medium circulation for cooling the conductor.

Further objects and advantages of this invention will become apparent and the invention will be better understood from the following description referring to the accompanying drawing, and the features of novelty which characterize this invention will be pointed out with particularity in the claims annexed to and forming a part of this specification.

In accordance with one aspect of this invention, the flexibility of an uninsulated or lightly insulated conductor is utilized while providing electrical insulation, moisture and weather proofing, and forced ventilation of the conductor by using a flexible tubular member surrounding the conductor. The tubular member is secured to the motor casing and the vehicle body providing a ventilating passage around the conductor. Thus, a portion of the cooling air from the motor is circulated through the tubular member abstracting heat from the conductor permitting the use of a conductor of small enough cross section to provide the requisite flexibility.

In the drawing there is shown a side elevational view, partly in section, illustrating the improved traction motor lead of this invention.

Referring now to the drawing, a traction motor 1 is hung from an axle 2 by suitable bearings, one of which is shown at 3. The axle 2 is secured to a pair of flanged wheels, one of which is shown at 4 and the motor 1 drives the axle 2 and wheels through suitable gearing (not shown) enclosed in gear casing 5. The nose of the motor 1 is resiliently supported by a transom 6 of the truck through springs 7 which overcome the tendency for the motor to rotate responsive to torque applied to the axle 2. The truck is secured, in any suitable manner (not shown), to the vehicle body, the floor of which is shown at 8.

The motor 1 is provided with a casing member 9 surrounding the field structure (not shown) and the armature member 10. The casing member 9 is provided with an opening 11 through which cooling air is blown into the motor and another opening 12 for the electrical leads, which will be hereinafter described. In the embodiment shown, a blower generally identified as 13 is mounted in the vehicle body and is connected to the opening 11 in the motor casing 9 by any suitable means, such as a flexible bellows 14. A lead connection box 15 is secured to the motor casing 9 in any suitable manner, as by welding, and communicates with the interior of the motor through the opening 12. The lead connection box 15 is provided with a suitable access cover 16. The floor 8 of the vehicle body is provided with an opening 17 therethrough and a lead connection box 18 is secured to the body floor 8 in any suitable manner, as by welding, and communicates with the interior of the body through the opening 17. An access cover 19 is also provided for the lead connection box 18. A suitable bus 20, which is connected to the appropriate electrical elements of the motor, enters the lead connection box 15 and another bus 21, which is connected to the electrical apparatus in the vehicle body, enters the lead connection box 18. The lead connection boxes 15 and 18 are provided with flanged openings 22 and 23 and a flexible stranded conductor 24, for instance copper, has its two ends respectively entering the openings 22 and 23 and connected to the bus bars 20 and 21. A flexible tubular member 25 formed of suitable material, such as rubber hose, surrounds the conductor 24 and is secured to the flange portions 22 and 23 by suitable clamps 26 and 27. The tubular member 25 thus provides an annular air passage 28 around the conductor 24. The conductor 24 may be provided with a thin plastic sleeve insulation in order to prevent corrosion of the copper, to confine the copper strands, and to confine any lubricant between the copper strands.

In operation, air is blown by the blower 13 through the flexible bellows 14 into the motor casing 9 as shown by the arrow 29. This high pressure cooling air abstracts heat from the motor windings and is exhausted through suitable openings in the casing (not shown). A portion of this air, however, enters the tubular member 25 through the lead connection box 15, as shown by the arrow 30, and is forced through the tube 25 and the connection box 18 into the cab 8, as shown by the arrow 31.

While a single ventilated lead is shown in the drawing, it will be readily understood that the motor will be provided with a plurality of such leads. Furthermore, while the motor is shown as being force ventilated by means of an external blower 13 and flexible bellows 14, it will be understood that this invention is equally applicable to a self-ventilated motor wherein the air is drawn into the motor casing 9 by means of a fan mounted on the armature. It will also be readily apparent that the upper end of the tube 25 may be open to the atmosphere, or the lower end may be open to the atmosphere. In this case, air may be drawn through the tube 25 by a fan in the cab.

It has been found that by air cooling traction motor leads in the manner described above using approximately 1½% of the total motor cooling air, it is possible to reduce the cross section area of each lead by one half and still retain a practical value of temperature rise with rated current. It will now be readily apparent that this construction eliminates the stiffness encountered with conventional lead insulation, and at the same time permits reduction of the cross section area by approximately one half. Furthermore, the entire lead assembly is completely water tight and the construction permits ready access to the lead and bus connections for inspection and maintenance, as compared with the previous taped connections used with unblown leads.

While I have illustrated and described a particular embodiment of this invention, modifications thereof will occur to those skilled in the art. I desire it to be understood, therefore, that this invention is not to be limited to the particular arrangement disclosed, and I intend, in the appended claims, to cover all modifications which do not depart from the spirit and scope of my invention.

What I claim as new and desire to secure by Letters Patent of the United States is:

1. In a vehicle having a body and a traction motor with an outer casing member having an opening therein, means in said body for circulating cooling medium through said motor, and a ventilated lead for said motor comprising an electrical conductor connected to said motor for conducting power thereto, and a tubular member surrounding said conductor having one end thereof secured to said casing member and communicating with said opening, the interior walls of said tubular member being spaced from said conductor providing a cooling medium passage whereby cooling medium from said motor is circulated through said tubular member for cooling said conductor.

2. In a vehicle having a body and a traction motor with an outer casing member and an opening therethrough, a ventilated lead for said motor comprising an electrical conductor having one end connected to said motor and its other end entering said body for conducting power to said motor, and a tubular member surrounding said conductor having one end secured to said motor casing communicating with said opening and its other end secured to said body communicating with the interior thereof, the interior walls of said tubular member being spaced from said conductor providing a cooling medium passage, and means for circulating cooling medium through said tubular member for cooling said conductor.

3. In a vehicle having a body and a traction motor with an outer casing member having an opening therein, means for circulating cooling medium through said motor, and a ventilated lead for said motor comprising an electrical conductor having one end connected to said motor and its other end entering said body for conducting power to said motor, and a tubular member surrounding said conductor having one end secured to said motor casing communicating with said opening and its other end secured to said body communicating with the interior thereof, the interior wall of said tubular member being spaced from said conductor providing a cooling medium passage whereby a cooling medium from said motor is circulated through said tubular member for cooling said conductor.

4. A vehicle having a body and a traction motor with an outer casing member having an opening therein, means in said body for circulating cooling medium through said motor, and a ventilated lead for said motor comprising an electrical conductor having one end connected to said motor and its other end entering said body, and a tubular member surrounding said conductor having one end secured to said motor casing communicating with said opening and its other end secured to said body communicating with the interior thereof, the interior walls of said tubular member being spaced from said conductor providing a cooling medium passage whereby cooling medium from said motor is circulated through said tubular member for cooling said conductor.

5. In a vehicle having a body and a traction motor with an outer casing member having an opening therein, means for circulating cooling medium through said motor, and a ventilated lead for said motor comprising a flexible electrical conductor having one end connected to said motor and its other end entering said body for conducting power to said motor, and a flexible tubular member surrounding said conductor having one end secured to said motor casing communicating with said opening and its other end secured to said body communicating with the interior thereof, the interior walls of said tubular member being spaced from said conductor providing a cooling medium passage whereby cooling medium from said motor is circulated through said tubular member for cooling said conductor.

WILLIAM W. PETERS.

REFERENCES CITED

The following references are of record in the file of this patent:

UNITED STATES PATENTS

| Number | Name | Date |
|---|---|---|
| 1,548,204 | Moesta | Aug. 4, 1925 |
| 2,173,717 | Hobart | Sept. 19, 1939 |
| 2,286,233 | Scott | June 16, 1942 |